United States Patent [19]
Locke et al.

[11] 3,929,225
[45] Dec. 30, 1975

[54] SHORT BICYCLE PACK
[75] Inventors: Frank W. Locke; John F. Sorenson, both of Minneapolis, Minn.
[73] Assignee: Hoerner Waldorf Corporation, St. Paul, Minn.
[22] Filed: Dec. 9, 1974
[21] Appl. No.: 531,052

[52] U.S. Cl. .............................. 206/335; 229/14 C
[51] Int. Cl.² .............................................. B65D 85/68
[58] Field of Search .......... 206/315, 319, 320, 326, 206/335, 419, 422, 521; 229/14 C; 217/37, 38

[56]  References Cited
UNITED STATES PATENTS
1,156,074  10/1915  Hahn ................................. 206/521
2,134,908  11/1938  Copeman ...................... 206/521 X
2,339,947   1/1944  Reaume .......................... 206/335 X
3,048,323   8/1962  Stauffer ........................... 206/419 X
3,871,546   3/1975  Thompson ...................... 206/335 X

*Primary Examiner*—William Price
*Assistant Examiner*—Stephen Marcus
*Attorney, Agent, or Firm*—Jerry F. Best

[57] ABSTRACT

An improved bicycle package requiring less space and providing greater strength for storage and shipment of bicycles, wherein the front wheel of the bicycle is removed and packed along side the frame with the wheels restrained in elongated slots formed in two opposing chanel-like trays which provide additional strength to the outer box, retain the parts of the bicycle in proper alignment and substantially reduce side damage to the pack.

3 Claims, 8 Drawing Figures

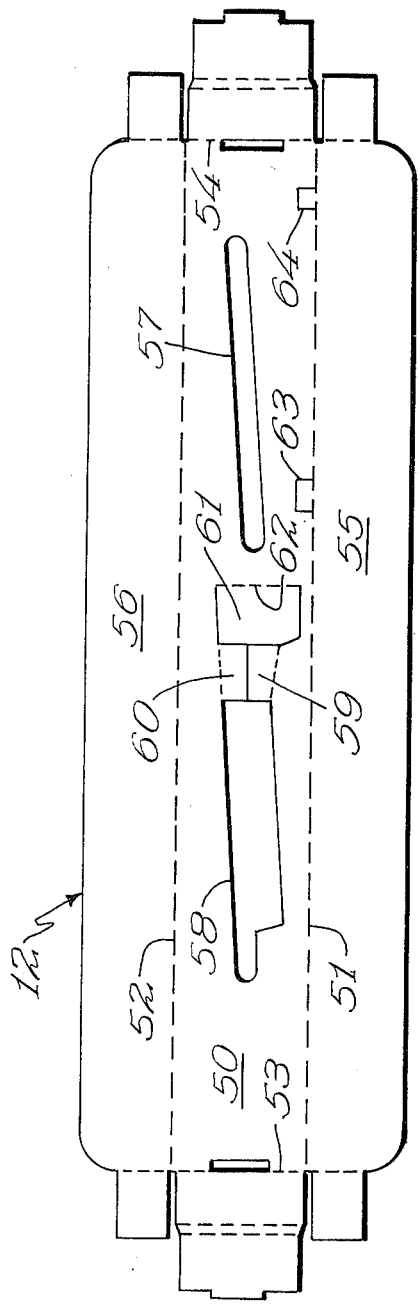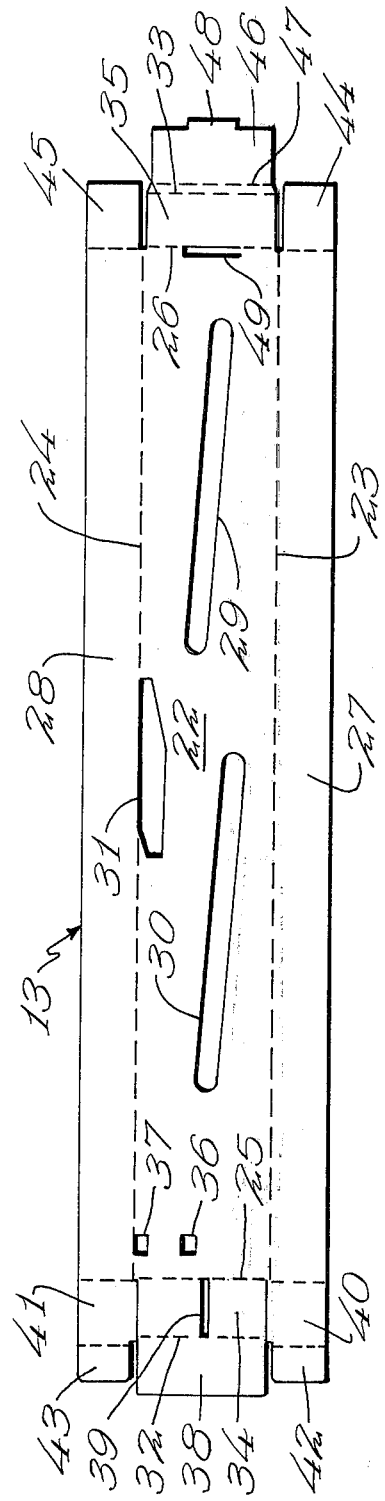

SHORT BICYCLE PACK

FIELD OF THE INVENTION

This disclosure relates to shipping and storage containers particularly adapted for use with bicycles which are partially disassembled.

DESCRIPTION OF THE PRIOR ART

Normally bicycles are shipped in corrugated containers and are packed with both wheel assemblies in place and the pedals, handle bars, and seat removed. Typically, this partially disassembled bicycle is placed inside a corrugated paperboard carton with no additional reinforcing or internal structure. The result is that these containers are tall and narrow and do not readily remain upright, so they are stored and shipped in a flat position which frequently results in damage from crushing, collapsing, or parts breaking through the boxes during movement and storage. There is a need for a package container for bicycles which eliminates these problems and which is also economical and easily assembled.

SUMMARY OF THE INVENTION

A space-saving bicycle storage and shipment container involving a shortened pack obtained by removing the front wheel of the bicycle and locating it along side the frame, and vertically disposed trays extending the length of the bicycle with apertures formed therein for receiving a portion of the circumference of the wheels as well as holding in place the frame and handle bars, with an outer box enclosing this entire assembly which results in a smaller package which has greater stacking strength due to the added material in the trays which also holds the bicycle parts in place to reduce the chance of them breaking through the sides of the pack.

BRIEF DESCRIPTION OF THE DRAWINGS

FIG. 3 is a plan view of a blank adapted to be folded into a tray for use with the present invention;

FIG. 4 is a plan view of a blank adapted to be folded into the upper tray for use with the present invention;

DESCRIPTION OF THE PREFERRED EMBODIMENT

Figure 1:
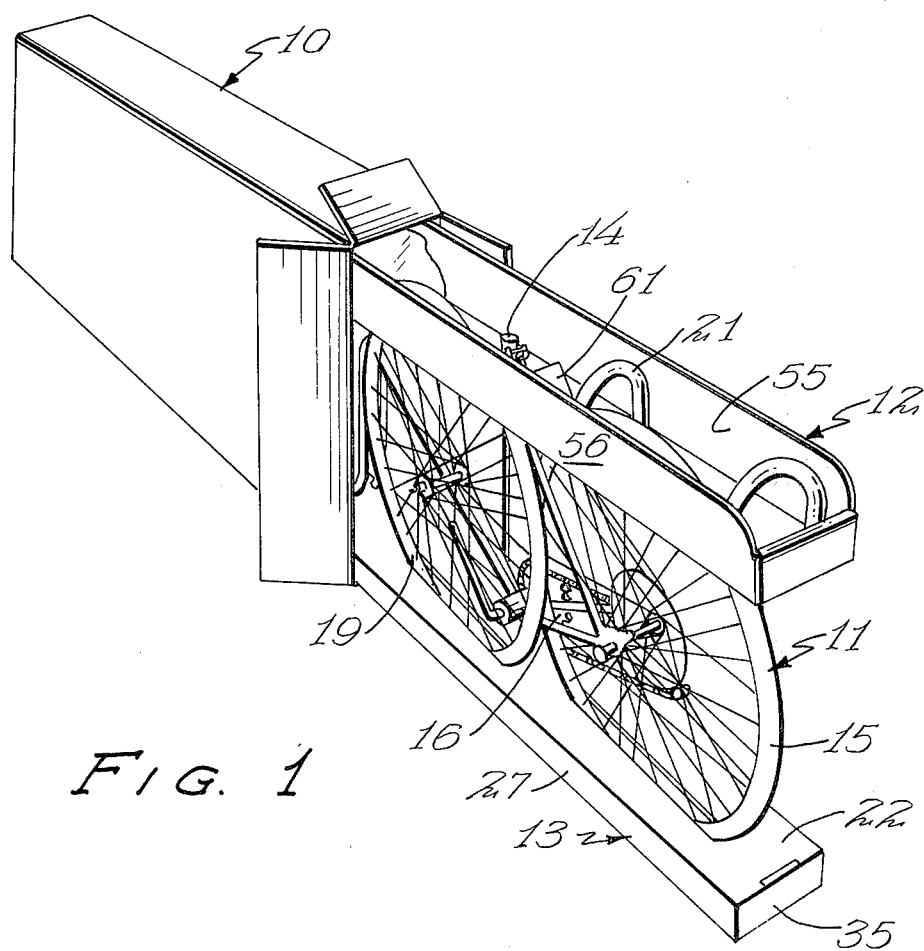
FIG. 1 is a perspective view of a bicycle pack embodying the present invention with the bicycle and trays partially removed from the outer box to illustrate the nature of the construction of the design.

This invention relates to a novel improvement in shipping and storage of bicycles which involves certain basic parts shown in FIG. 1 including an outer box 10, a bicycle 11, an upper tray 12 and a lower tray 13. As shown in the various drawings, the bicycle has a tubular frame 14 and a rear wheel 15 connected thereto which is driven by a chain from a sprocket 16 which is in turn driven by the pedal cranks 17 and 18. A front wheel 19 is removed from the fork 20 which is attached to the front portion of the frame 14, and the front wheel 19 is moved backward toward the rear wheel 15 so that it lies along side the frame 14 and permits the overall dimensions of the pack to be reduced. This provides a space savings of approximately 20% due to the reduction in length, and also allows the height of the carton to be reduced since the bottom end of the fork 20 may be rotated downward to lie within the package making the overall height of the box only slightly greater than the diameter of the wheels 15 and 19.

Figure 2:
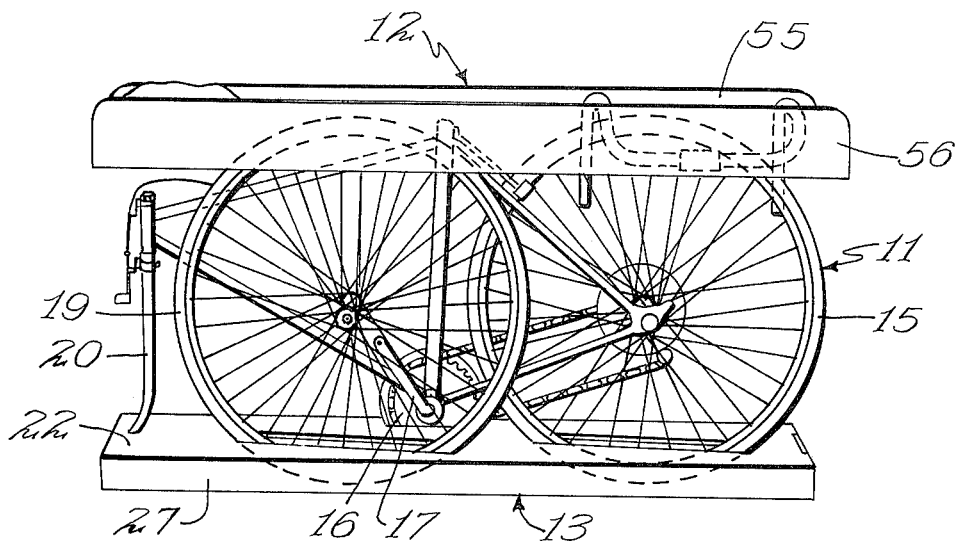
FIG. 2 is a perspective view shown generally from the side and illustrating the arrangement of the various parts of the bicycle in the upper and lower trays prior to insertion into the outer box.
Figure 5:
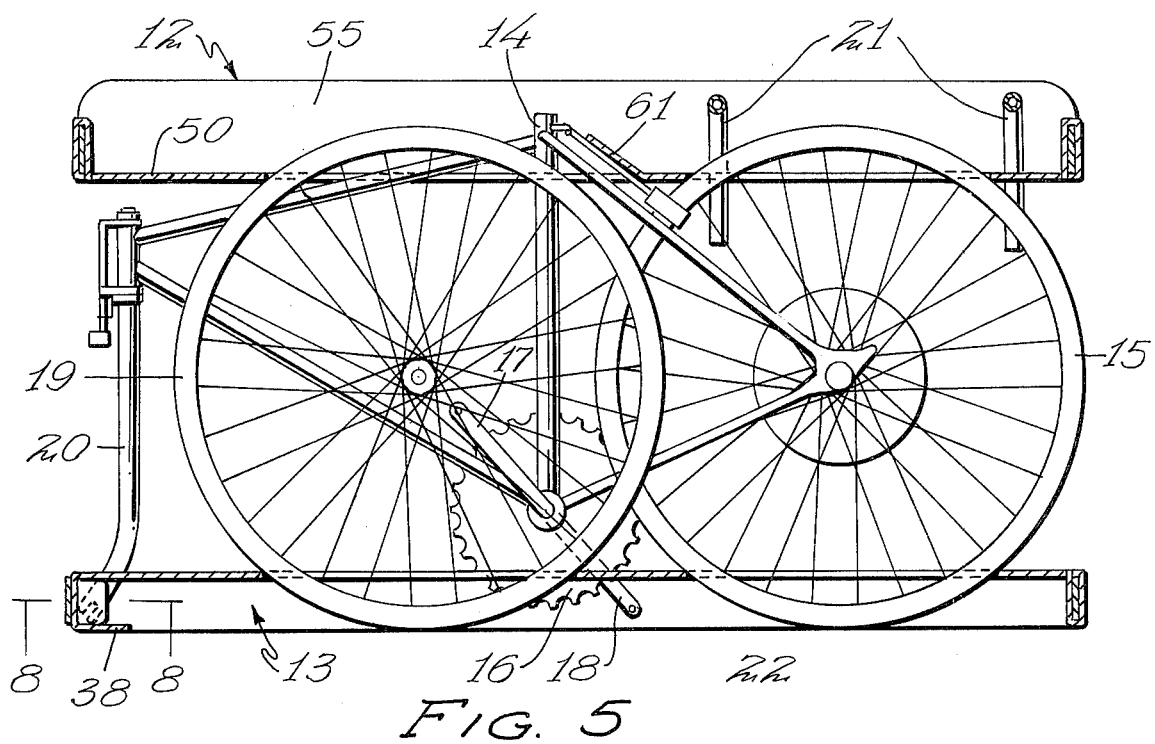
FIG. 5 is a side elevational section view of the trays and partially disassembled bicycle shown in FIG. 2 illustrating how the bicycle parts are inserted into the various openings in the trays.
Figure 6:
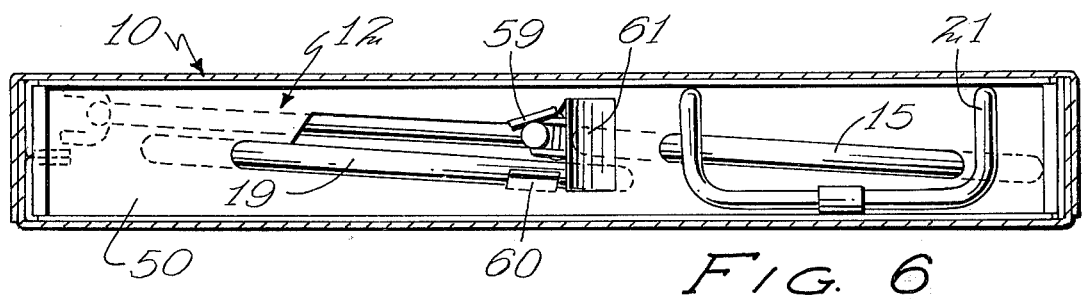
FIG. 6 is a top plan view of the disassembled bicycle and trays shown in FIG. 2.
Figure 7:
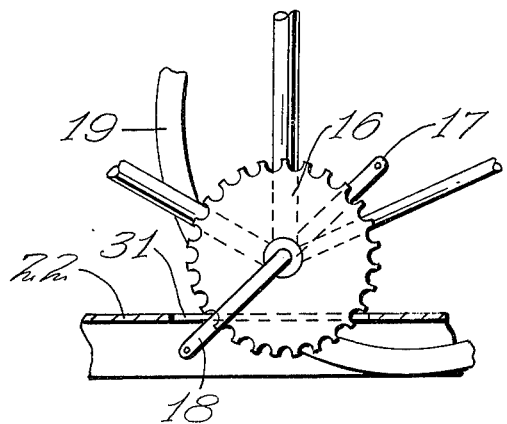
FIG. 7 is a side elevational view of a portion of the bicycle and lower tray seen from the opposite side of that view in FIG. 5.

The bicycle also includes a pair of handle bars 21 which are removed from the front of the frame 14. The container consists of the upper tray 12 and the lower tray 13 which will be described in more detail later. In FIGS. 3 and 4 the blanks which are scored and die cut for folding into the upper and lower trays 12 and 13 are shown in plan view. FIG. 3 shows a blank substantially rectangular in cross section having a main panel 22 defined by two horizontal parallel fold lines 23 and 24 and defined at its ends by two parallel fold lines 25 and 26 perpendicular to the fold lines 23 and 24. The parallel fold lines 23 and 24 are spaced inwardly from the edges of the blank and thereby define two side walls 27 and 28 which extend the length of the blank and as can be seen in FIGS. 1 and 2 are folded into a downwardly extending position. Located within the main panel 22 of the blank shown in FIG. 3 is an elongate opening 29 formed to receive a portion of the circumference of the rear wheel 15, an elongate opening 30 formed in the base panel 22 and adapted to receive a portion of the circumference of the front wheel 19, and an elongate opening 31 which is adapted to receive a portion of the sprocket and pedal crank assembly 16 and 18 as can be seen in FIGS. 5 and 7. At one end of the blank are two apertures or openings 36 and 37 whose purpose and function is to receive the lower end of the fork member 20 as can be seen in FIG. 5 which helps retain the bicycle frame 14 in position during shipment. The ends of the blank shown in FIG. 3 are shown with means for locking the side walls 27 and 28 in position. The parallel vertical fold lines 25 and 26 have spaced outwardly therefrom parallel fold lines 32 and 33 which define end panels 34 and 35 which must be held in position along with the side walls 27 and 28 during assembly of the container.

Figure 8:
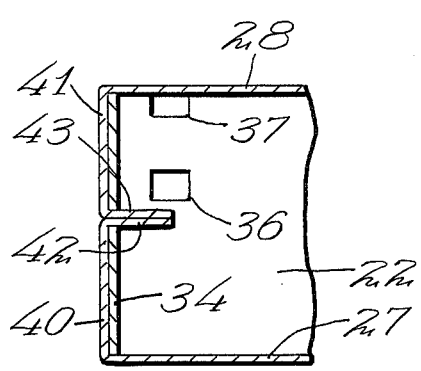
FIG. 8 is a sectioned view of a portion of the lower tray at the front end thereof, taken along section line 8—8 in FIG. 5 and viewed from the bottom.

It is obvious that the closure at the end of the blank in FIG. 3 is different from the closures at the opposite end and of the other blank shown in FIG. 4. The reason for this is that it was desired that all the closures be of the self-locking type and since it was also desired that the package be as short as possible it became necessary to provide a support flap 38 on the end of the closure which can be seen in FIGS. 5 and 8 to lie flat against the bottom of the outer box 10 to provide additional support for the bottom ends of the fork 20 to prevent them from pushing through the bottom of the outer box 10. Therefore, a different style of self-locking end closure was necessary and incorporates an elongate slot 39 formed in the end wall 34 along with two end wall cover flaps hingedly attached to the side walls 27 and 28 and shown as 40 and 41 which fold down and toward one another to provide an outer cover for the end wall 34. The flaps 40 and 41 have hingedly attached thereto tuck-in tabs 42 and 43 which insert into the slot 39 to affect the closure at the top end of the blank shown in FIG. 3. The apertures 36 and 37 are located so that they do not interfere with the inserted tabs 42 and 43.

The closure at the opposite end of the blank in FIG. 3 is similar to the closures on both ends of the other blank shown in FIG. 4 and includes a pair of inwardly folded flaps 44 and 45 which are hingedly attached to the ends of the side walls 27 and 28 and which are foldable inwardly to lie in face-to-face relationship with the end wall 35. The end wall 35 lies on the outside of the tray with the inwardly foldable flaps 44 and 45 directly on the inside thereof, and a locking flap 46 is hingedly attached along the fold line 47 which is parallel to the fold line 33 and spaced a small distance therefrom so that the thickness of the flaps 44 and 45 is accommodated when the locking flap 46 is folded down and the tab 48 is inserted into the vertical slot 49 formed adjacent to the fold line 26 in the base panel 22. This closure can be seen in section view from the side in FIG. 5 and permits the upper and lower trays 12 and 13 to be assembled without the use of additional adhesives or connecting devices and permits them to be preassembled and brought to the bicycle loading station.

The blank shown in FIG. 4 is adapted to be folded into the upper tray and similarly consists of a base section 50 defined by parallel horizontal fold lines 51 and 52 and vertical parallel fold lines 53 and 54 at opposite ends of the base section 50. The horizontal parallel fold lines 51 and 52 connect a pair of side wall panels 55 and 56 to the panel 50 which in the case of the upper tray 12 are folded upwardly and at each end of the blank shown in FIG. 4 is a self-locking closure similar to that just described for the end of the blank in FIG. 3. Each of the individual parts of those closures will not be described. As can be seen there are apertures formed in the base panel 50 including an aperture 57 adapted to receive a portion of the top of the rear wheel 15 and an aperture 58 which is adapted to receive a portion of the top of the front wheel 19 as well as a portion of the frame 14 against which the front wheel 19 is located in the container. This aperture 58 is die cut and some parts are left in to help position and retain the frame 14 of the bicycle in position. These are shown as two flaps 59 and 60 which serve to engage the side of the front wheel 19 and that portion of the frame 14 to which the seat attaches, and a third panel 61 which is hingedly attached along a horizontal fold line 62 and as can be seen in FIG. 5 assists in restraining movement of the frame within the carton. Apertures 63 and 64 are formed along the vertical fold line 51 to receive the ends of the handle bar assembly 21. The uppper portion of the handle bars 21 then drapes over the top of the rear wheel 15 extending through the aperture 57 in the upper tray 12.

The miscellaneous parts of the bicycle such as the pedals and other loose hardware may be placed in a bag (not shown) and placed within the container rather than employing the use of a small box as is often presently the case adding to the cost of the container. It can be seen that a great deal of side strength is produced in the carton by virtue of the outer box, the strength obtained from the edge arrangement of the base panels 22 and 50 of the two trays, as well as the multiple thickness edge strength of each of the end closures at the opposite ends of the trays. This allows the container to be stacked on its side and the bicycle parts will be suspended within the trays in a rigid manner without significant nature of them loosening and putting stress on the side walls of the outer box.

In accordance with the Patent Statutes, I have described the principles of construction and operation of my improvement in SHORT BICYCLE PACK; and while I have endeavored to set forth the best embodiment thereof, I desire to have it understood that obvious changes may be made within the scope of the following claims without departing from the spirit of my invention.

I claim:

1. A package for shipping and storing a partially disassembled bicycle of the type having a frame with a rear wheel mounted thereto, a sprocket wheel and chain, a front wheel support member at the front of said frame in the form of a fork, with handle bars, pedals, and a front wheel being removed from said frame, said front wheel positioned to one side of said fork toward said rear wheel to form a shortened package, said container made of foldable sheet-like material and comprising:

a lower die cut tray having downwardly extending side walls;

an upper die cut tray having upwardly extending side walls;

said upper and lower trays having first die cut elongate openings formed therein and positioned with the edges of said openings in engagement with a portion of the circumference of said rear wheel of said bicycle;

said elongated openings being parallel and in angular relationship to the sides of said trays;

said bicycle frame and said rear wheel being positioned angularly within said container to allow said front wheel to be located at one side of said frame;

said upper and lower trays having formed therein second parallel elongated openings engaging a portion of the circumference of said front wheel;

said upper tray having formed therein openings with said handle bars positioned with a portion of said handle bars extending downwardly through said openings in said upper tray;

said upper die cut tray having formed therein a third opening, the edges of said third opening engaging a portion of said frame;

said lower die cut tray having formed therein a fourth opening, the edges of said fourth opening engaging a portion of the circumference of said sprocket wheel and chain attached to said frame;

said lower die cut tray having a pair of fifth openings formed therein and at one end thereof, the edges of said fifth openings engaging the lower ends of said fork of said frame, a first of said downwardly extending end walls in said lower die cut tray having attached thereto a horizontally positioned support flap on which the lower end of said fork is positioned; and an enclosing box structure completely surrounding said bicycle and said trays.

2. The package of claim 1 including: downwardly extending end walls attached to said lower tray; upwardly extending end walls attached to said upper tray; and means integral with said ends of said upper and lower trays for locking said side and end walls in erected position.

3. The package of claim 1, wherein said enclosing box structure is of the end-loading type.

* * * * *